United States Patent
Sarkar

(10) Patent No.: US 11,854,358 B2
(45) Date of Patent: *Dec. 26, 2023

(54) MONITORING SYSTEM

(71) Applicant: CONNECT-IN LTD, Glasgow (GB)

(72) Inventor: Prithviraj Sarkar, Glasgow (GB)

(73) Assignee: CONNECT-IN LTD., Glasgow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,931

(22) Filed: Jun. 15, 2018

(65) Prior Publication Data

US 2018/0293861 A1 Oct. 11, 2018

Related U.S. Application Data

(63) Continuation of application No. 14/423,191, filed as application No. PCT/GB2013/052225 on Aug. 22, 2013, now Pat. No. 10,026,287.

(51) Int. Cl.
| | |
|---|---|
| *G08B 13/24* | (2006.01) |
| *G08B 13/14* | (2006.01) |
| *G06F 21/88* | (2013.01) |
| *G06K 7/10* | (2006.01) |

(52) U.S. Cl.
CPC ......... *G08B 13/2402* (2013.01); *G06F 21/88* (2013.01); *G06K 7/10366* (2013.01); *G08B 13/1427* (2013.01); *G08B 13/2465* (2013.01)

(58) Field of Classification Search
CPC ............ G08B 13/2402; G08B 13/1427; G08B 13/2465; G06F 21/88; G06K 7/10366
See application file for complete search history.

(56) References Cited

U.S. PATENT DOCUMENTS

| | | |
|---|---|---|
| 6,577,238 B1 | 6/2003 | Whitesmith et al. |
| 8,810,392 B1 | 8/2014 | Teller et al. |
| 2001/0050613 A1 | 12/2001 | Clark |
| 2003/0034887 A1* | 2/2003 | Crabtree ............... G01S 3/54 |
| | | 340/568.1 |
| 2003/0134657 A1 | 7/2003 | Norta et al. |
| 2005/0057359 A1* | 3/2005 | Coffey ............ G08B 21/0202 |
| | | 340/539.21 |
| 2005/0134459 A1 | 6/2005 | Glick et al. |

(Continued)

FOREIGN PATENT DOCUMENTS

| | | |
|---|---|---|
| CN | 103366519 A | 10/2013 |
| DE | 102007059978 A1 | 6/2008 |

(Continued)

OTHER PUBLICATIONS

International Search Report received for PCT Patent Application No. PCT/GB2013/052225, dated Nov. 26, 2013, 3 pages.

*Primary Examiner* — Amine Benlagsir
(74) *Attorney, Agent, or Firm* — FRESH IP PLC; Clifford D. Hyra; Aubrey Y. Chen

(57) ABSTRACT

A monitoring system for deriving a measurement of a separation distance between a monitor and one or more tags, where each tag is adapted to be attached to or contained within an object to be monitored, comprises a monitor that is operable to trigger an event if the separation distance exceeds a set separation limit. A frequency of packet exchange between a tag and monitor is dynamically altered based on a comparison of one or more.

9 Claims, 10 Drawing Sheets

(56) References Cited

U.S. PATENT DOCUMENTS

| | | |
|---|---|---|
| 2005/0200478 A1* | 9/2005 | Koch .................... G06Q 10/08 340/539.13 |
| 2006/0015503 A1 | 1/2006 | Simons et al. |
| 2006/0058018 A1 | 3/2006 | Toulis et al. |
| 2006/0197658 A1 | 9/2006 | Light et al. |
| 2006/0244590 A1 | 11/2006 | Itoh et al. |
| 2007/0052534 A1 | 3/2007 | Bird et al. |
| 2007/0096984 A1 | 5/2007 | Leitch et al. |
| 2008/0207357 A1 | 8/2008 | Savarese et al. |
| 2009/0040041 A1 | 2/2009 | Jaretis et al. |
| 2009/0079567 A1 | 3/2009 | Patel |
| 2009/0221301 A1 | 9/2009 | Riley et al. |
| 2009/0231136 A1 | 9/2009 | Sugla et al. |
| 2009/0315717 A1 | 12/2009 | Soomro et al. |
| 2010/0060425 A1* | 3/2010 | Rodriguez .............. H04Q 9/00 340/10.1 |
| 2010/0156624 A1 | 6/2010 | Hounsell |
| 2010/0178913 A1 | 7/2010 | Herbert et al. |
| 2010/0283600 A1 | 11/2010 | Herbert et al. |
| 2010/0302979 A1 | 12/2010 | Reunamaki |
| 2011/0084806 A1* | 4/2011 | Perkins ................. A61B 5/1113 340/10.1 |
| 2011/0092161 A1 | 4/2011 | Dotah |
| 2012/0003932 A1 | 1/2012 | Zhodzishsky |
| 2012/0154147 A1* | 6/2012 | Cao .................... G08B 21/0247 340/539.13 |
| 2012/0220351 A1 | 8/2012 | Kerai et al. |
| 2013/0003630 A1 | 1/2013 | Xhafa et al. |
| 2013/0015971 A1* | 1/2013 | Caporizzo ........... G08B 13/1427 340/539.32 |
| 2013/0181839 A1* | 7/2013 | Cao ....................... G08B 13/08 340/572.1 |
| 2014/0073262 A1 | 3/2014 | Gutierrez et al. |
| 2014/0132411 A1 | 5/2014 | Buchheim et al. |
| 2014/0213301 A1 | 7/2014 | Evans et al. |

FOREIGN PATENT DOCUMENTS

| | | |
|---|---|---|
| EP | 1855258 A1 | 11/2007 |
| TW | 201436621 A | 9/2014 |
| WO | 2014/042507 A1 | 3/2014 |
| WO | 2014/048994 A2 | 4/2014 |
| WO | 2014/160372 A1 | 10/2014 |

\* cited by examiner

MONITORING SYSTEM

CROSS-REFERENCE TO RELATED APPLICATIONS

The present application is a continuation of U.S. patent application Ser. No. 14/423,191 (filed Feb. 23, 2015), which is a National Stage Application of PCT International Application No. PCT/GB2013/052225 (filed on Aug. 22, 2013), under 35 U.S.C. § 371, which claims priority to Great Britain Patent Application No. GB 1214976.1 (filed on Aug. 22, 2012), which are each hereby incorporated by reference in their respective entireties.

This disclosure relates to a system for proximity monitoring. The monitoring of one or more objects by use of an electronic tag attached to each object is described. One use of the system is to prevent accidental loss or theft. Another is to prevent unauthorised access to electronic devices. Other use cases may include but are not limited to localised tracking and finding of objects or remote tracking including crowd sourcing to find lost bicycles etc. as described and further elaborated below.

Systems of this general nature are known both in prior art and commercially. However, known systems have many limitations including a lack of the ability to predict the separation distance between the wireless tag and the monitor, false alarms, a lack of adaptability to changes in environment, and poor battery life. The present disclosure addresses these limitations.

Localisation of electronically tagged objects has been a challenge for many years, especially in systems where tags need to be small and power consumption minimal, and where both tag and monitor may be mobile and the spatial coordinates of these cannot be known. Such systems typically rely on Received Signal Strength Indication (RSSI) to monitor proximity. Known systems in this category cannot accurately estimate the range, and reliability is low. Most known systems are 'proximity detection' rather than 'proximity measurement'. Embodiments of the present disclosure are able to measure the separation distance within accuracy of about 1 m or better.

According to the present disclosure there is provided a monitoring system comprising a monitor and at least one tag, each tag being adapted to be attached to or contained within an object to be monitored; the monitor including a radio transmitter/receiver and each tag including a radio transmitter/receiver adapted to transmit periodic signals; the monitor being operable to derive a measurement of the separation distance between the monitor and a given tag and to trigger an event if that distance exceeds a set separation limit. According to one optional aspect, a frequency of packet exchange between a tag and monitor is dynamically altered based on a comparison of one or more monitored parameters with a mode transition threshold.

Optionally, a low power radio protocol is used for the communication between a monitor and a tag.

Optionally, the radio protocol is Bluetooth Low Energy (BLE).

Optionally, a monitor, when connected to a tag, can switch between an activity monitor mode in which a connection interval for data exchange is set at a first value and a critical activity monitor mode in which a connection interval for data exchange is set at a second value which is higher than said first value.

Optionally, the monitored parameters comprise one or more radio signal strength parameters.

Optionally, said one or more radio signal strength parameters comprise one or more of: received signal strength indication, link quality index; or parameters derived therefrom.

Optionally, the monitored parameters comprise one or more non-radio parameters.

Optionally, said one or more non-radio parameters comprise one or more of:

accelerometer data, positional system data; or parameters derived therefrom.

Optionally, communication between a monitor to a tag (to initiate the activity monitor mode) is initiated by an interrupt event.

Optionally, the monitor makes a decision to trigger an event when an event trigger threshold is reached or exceeded, and said decision involves evaluating environmental conditions.

Optionally, the evaluation of environmental conditions comprises monitoring one or more parameters including at least one radio parameter and/or at least one non-radio parameter.

Optionally, the decision to trigger an event is determined by a fuzzy logic component.

Optionally, the decision to trigger an event is made by a neural network.

Optionally, the decision to trigger an event is made through a neural fuzzy inference engine.

Optionally, the monitor is a self contained user-portable device.

Optionally, the monitor is a smartphone or tablet running a suitable software application.

Optionally, the monitor is a computer or computer peripheral running a suitable software application.

Optionally, the triggered event is the generation of an alarm.

Optionally, the alarm comprises an audible alarm, a mechanical vibration or visual indication. LEDs or other suitable light sources; or on-screen alerts may be used as the visual indication.

Optionally, the triggered event is the locking of an electronic device acting as the monitor/peripheral.

Optionally, the radio transmitter of the tag is a transponder which responds to periodic interrogation signals from the monitor.

Optionally, the monitor derives said measurement by assessment of the strength of the signal received from the tag.

Optionally, the monitor and/or the tag includes means for detecting changes in orientation or movements, and is arranged to filter received modify separation criteria during periods of rapid change in orientation/movement.

Optionally, the means for detecting changes in orientation/movements comprises an accelerometer, preferably a 3-axis accelerometer.

Optionally, the system includes a secondary user interface device.

Optionally, one or more of the tag(s) is also provided with an alarm mechanism which triggers when the monitor generates an alarm. The alarm mechanism may comprise an audible alarm, a mechanical vibration or visual indication. LEDs or other suitable light sources; or on-screen alerts may be used as the visual indication.

Optionally, the monitor includes geo-location means such as a GPS receiver.

Optionally, the alarm system is in a power-down/sleep mode whenever the geo-location means detects that it is at a predetermined "home" location.

Optionally, the means for detecting a pre-determined "home" location is the proximity of the monitor to a WiFi hotspot, another fixed node tag or use of GPS coordinates.

Optionally, the monitor is arranged to record its geo-location at a time when an event (alarm/lock) is generated.

Optionally, the monitor, on generation of an event, sends said geo-location to a database held on a remote server.

Optionally, the monitor is arranged to communicate details of a lost object via the remote server to other similar monitors in a crowd-sourcing environment and to receive details if the object is located by another monitor.

According to a second aspect of the disclosure there is provided a method of monitoring a separation distance between a monitor and one or more tags, each tag being adapted to be attached to or contained within an object to be monitored; comprising the steps of: transmitting periodic radio signals between the monitor and the or each tag; deriving a measurement of the separation distance between the monitor and a given tag; and triggering an event if that distance exceeds a set separation limit; wherein a frequency of data exchange between a connected tag and monitor is dynamically altered based on a comparison of one or more monitored parameters with a mode transition threshold.

The method may also comprise the steps of providing the various features of the first aspect and using them as described herein.

According to a third aspect of the disclosure there is provided a monitoring system comprising a monitor and at least one tag, each tag being adapted to be attached to or contained within an object to be monitored; the monitor including a radio transmitter/receiver and each tag including a radio transmitter/receiver adapted to transmit periodic signals; the monitor being operable to derive a measurement of the separation distance between the monitor and a given tag and to trigger an event if that distance exceeds a set separation limit; and the monitor makes a decision to trigger an event when an event trigger threshold is reached or exceeded, where said decision involves evaluating external environmental conditions.

Optionally, the evaluating of external environmental conditions comprises evaluating data from one or more set parameters including at least one radio parameter and/or at least one non-radio parameter.

Optionally, the decision to trigger an event is determined by a neural fuzzy system component.

According to a fourth aspect of the disclosure there is provided a method of monitoring a separation distance between a monitor and one or more tags, each tag being adapted to be attached to or contained within an object to be monitored; comprising the steps of: transmitting periodic radio signals between the monitor and the or each tag; deriving a measurement of the separation distance between the monitor and a given tag; and triggering an event if that distance exceeds a set separation limit; wherein the monitor makes a decision to trigger an event when an event trigger threshold is reached or exceeded, where said decision involves monitoring environmental conditions. The method may also comprise the steps of providing the various features of the third aspect and using them as described herein.

According to a fifth aspect of the disclosure there is provided a monitor for use in the preceding aspects, comprising a smartphone or tablet including geo-location means and an accelerometer; or comprising a dedicated stand-alone monitor. Optionally, the monitor is BLE enabled and arranged to run in BLE master mode.

According to a sixth aspect of the disclosure there is provided a tag for use in the preceding aspects, including means for providing a unique identity and a radio frequency transponder with matched antenna, the tag being physically small in relation to an object to be monitored and readily attachable thereto. Optionally, the tag is BLE enabled and arranged to run in BLE slave/peripheral mode.

According to a seventh aspect of the disclosure there is provided a computer program product a computer program product encoded with instructions that when run on a computer, enable the computer to perform the functions of a monitor and/or a tag in the systems, methods and apparatus of any preceding claim.

Optionally, the computer program product is provided as a smartphone/tablet application for download, for example from an application store.

The computer program product may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

Embodiments of the present disclosure will now be described, by way of example only, with reference to the drawings, in which:

FIG. 1A is a schematic overview of one embodiment of the disclosure;

FIG. 1B-D show alternative mechanisms through which the system can be optimised for lower power performance;

In general terms, embodiments of the disclosure refers to mobile electronic tag(s) and a tag monitor system capable of registering and generating a specified 'real-time' or a 'scheduled' event based upon whether two components of the system are 'outside of proximity zone' or 'within proximity zone'; where the zone boundaries can be defined by the user and stipulated through an User Interface (UI). The system may provide a power and performance module, with hardware and software components, that improves the reliability and functionality of the monitoring system.

Figure 1A:
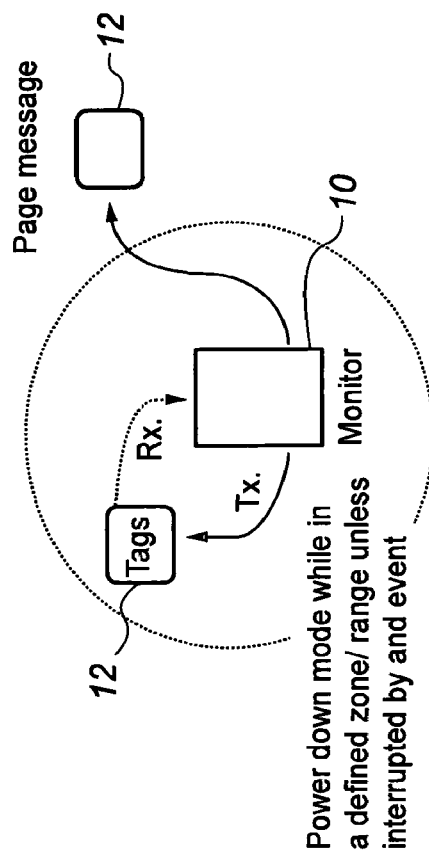

Referring to FIG. 1A, a monitoring system comprises a monitor 10 and one or more tags 12. A "tag" may also be referred to as a "peripheral device" or simply a "peripheral".

The monitor 10 is most conveniently a portable computing device such as a smartphone or tablet running a suitable application. Alternatively, other forms of monitor may be used such as a dedicated appliance in the form of a key fob. This key fob can also act as a BLE-peripheral/slave device in the presence of a BLE-enabled smartphone/tablet/PC monitor. The system remains in a power down mode while the monitor and tag are within a defined range of each other, unless interrupted by an event.

In operation, each tag 12 periodically sends a signal to the monitor 10, which assesses the received signal to derive a measure of the separation between the two. The periodic signal is unique to the particular tag. Each tag may have a unique identifier (such as a universally unique identifier) assigned to it. Once connected and paired the system knows and remembers this unique identifier and is hence able to identify which tag is sending which signals.

Figure 1B:
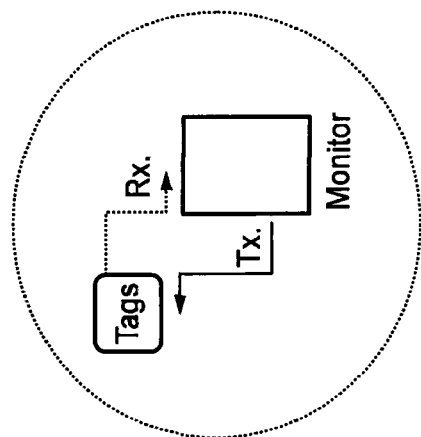
Figure 1C:
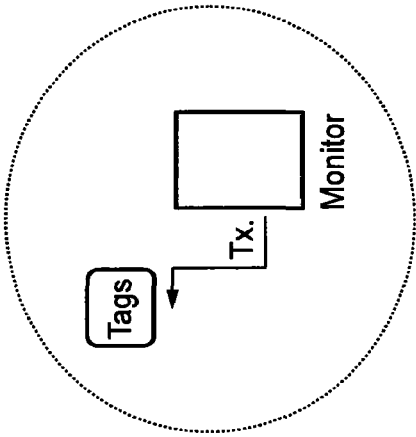
Figure 1D:
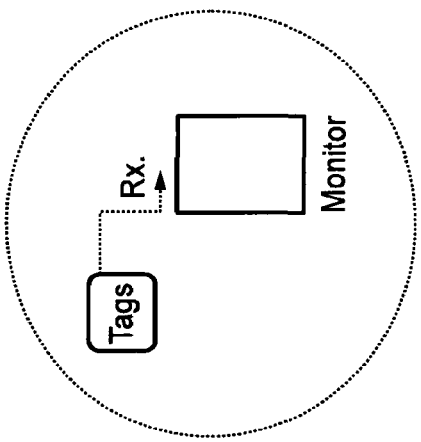

FIGS. 1B to 1D show different connection options between monitor and tag. FIG. 1B shows a ping pong scheme where both devices send data, while FIG. 1C shows a "tag receive only" scheme and FIG. 1D shows a "tag send only" scheme. If only one device sends packets instead of both then certain power savings are obtained which is of significance over a large time period. The third scheme is most preferred in a power down (PD) mode as computation is handled on the monitor side and may be utilised with a standardised or proprietary radio protocol.

The assessment of the received signal to derive a measure of the separation between tag and monitor may suitably be based on Received Signal Strength Indication (RSSI); preferred forms of the disclosure add further features in addition to RSSI in order to improve accuracy and performance, as is discussed below. If the distance assessment indicates a separation greater than a user-defined threshold, a trigger response is initiated in the monitor and/or the tag.

The trigger response, generally termed as an "event" can be an alarm or another action such as locking a device or a computer. An alarm can be any kind of alert and may for example be an audible alarm, a mechanical vibration or a visual indication. The visual indication may be provided by an LED or other light source and/or by on-screen displays.

Thus, if the tag is attached to say a handbag and the owner, having put it down, leaves it behind, the alarm will be triggered as soon as the owner moves more than a certain specified distance away. Similarly, the alarm will be triggered if another person attempts to remove the handbag. The threshold distance may usefully be set between 5 m and 50 m (or longer in free space).

The tag 12 may be programmed to transmit its signal at pre-set intervals. Alternatively, it may transmit its signal in response to a request from the monitor 10. The monitor 10 or tag(s) 12 can wake up from the power down/sleep mode by a specified interrupt. Each tag may stay either in a low response connectable/discoverable/listening mode while in the power-down state or a connected state with low latency and send empty packets or stay-alive messages where appropriate.

Figure 2:
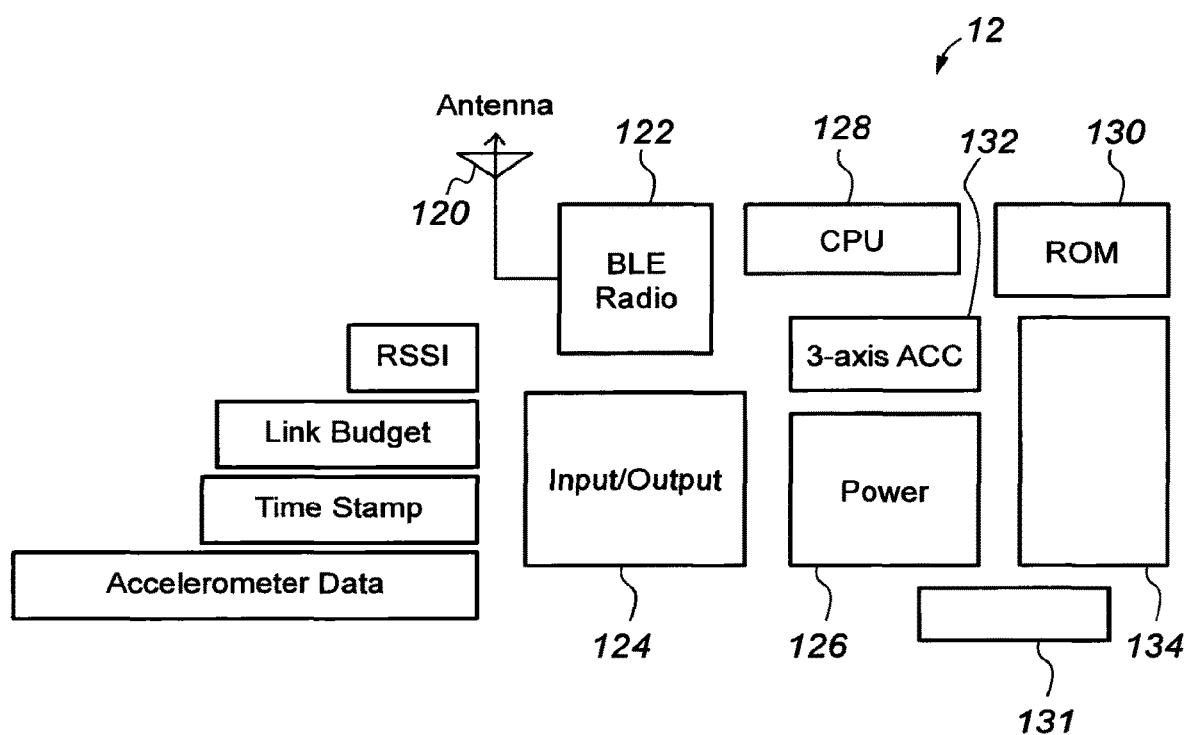
FIG. 2 is a block diagram of one form of tag which may be used in the present disclosure.

FIG. 2 shows a preferred form of tag 12. The preferred embodiments of the disclosure make use of Bluetooth Low Energy (BLE) technology as the radio component in order to support better battery life and be readily connectable to a BLE enabled smartphone. The system further includes a dedicated application level power manager module to further improve significant battery life; this module includes a software component in the form of an algorithm and may be supported by a hardware component to detect external interrupt(s) or an external hardware clock with dedicated utility.

The tag 12 comprises an antenna 120, a BLE radio circuit 122, input/output circuit 124, power supply 126 including a battery, CPU 128 and ROM 130. The tag 12 may also optionally include a 3-axis accelerometer 132 and a buzzer 134. The provision of a buzzer allows a tag to give an alarm if the user moves away from the monitor 10 while carrying the tagged item.

In preferred embodiments, the buzzer may be a piezo transducer arrangement. A piezo transducer does not contain a circuit, and so therefore needs an external signal. This signal may be supplied by the output pin of a system on a chip (SOC) 131 containing a microcontroller. Advantageously, a piezo transducer arrangement requires less current to operate than a mechanical or electromechanical buzzer and so lasts longer in battery powered circuits, although these and other types of buzzer may be used if desired.

In one embodiment, the tag 12 may suitably be assembled with its minimum components and fabricated on same pcb with external spacing for the battery holder conductor to save space. In this manner, a very low form factor is achieved, which is small enough to fit inside a wallet or passport, or to be adhered to any such object. The antenna may be formed on the pcb as a meandered inverted-F antenna, adjusted and optimised for impedance match and performance.

The system may optionally include a secondary user interface (SUI) 14 (FIG. 3), this being a device which allows limited interaction between the user and the monitor for convenience (specifically suited to control the snooze feature). The SUI 14 is conveniently a BLE peripheral with a user interface, for example a smart-watch that can also act as a tag and alert user when the monitor is moving out of the range.

Figure 3:
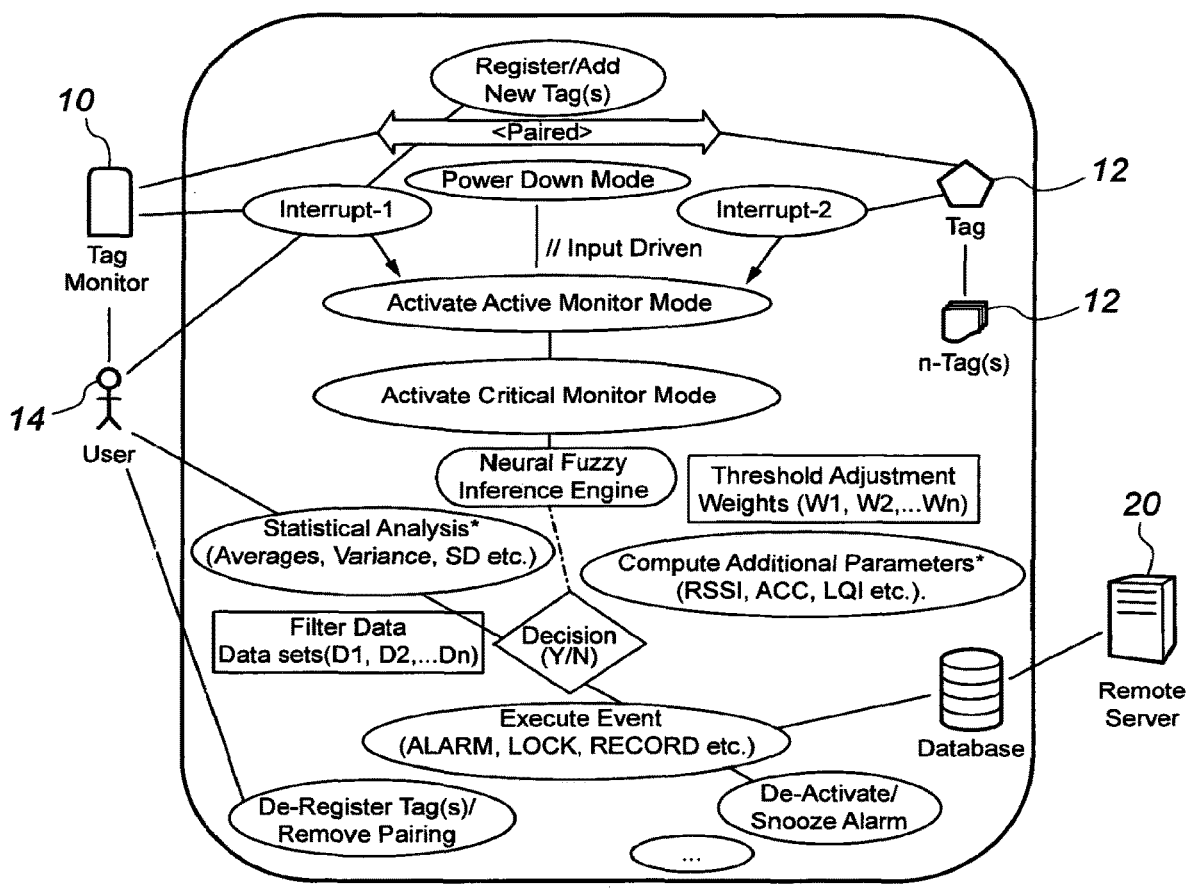
FIG. 3 is a graphic depiction of common use cases for the system.

Referring to FIG. 3, the user can add a new tag 12 to the system by registering the tag. The user instructs the monitor 10 to search for a new tag, whose details are then stored in the monitor 10; a descriptive term can be added such as "handbag" or "laptop".

Registered tags can be locked or unlocked (activated or deactivated) via the monitor 12, either individually or en bloc. If a tag goes out of range, 10 the system raises an alarm via the audio output of the monitor 10. An alarm message can also be passed to other BLE devices such as the SUI 14. The alarm may be programmed to auto-stop after a predetermined time.

The user may deactivate or snooze alarms via the monitor 10 or SUI 14. The snooze function leaves the system running but supresses any alarm indication for an out-of-range tag.

The monitor 10 may also be used to de-register a tag 12, that is remove its identity from the system.

Figure 4A:
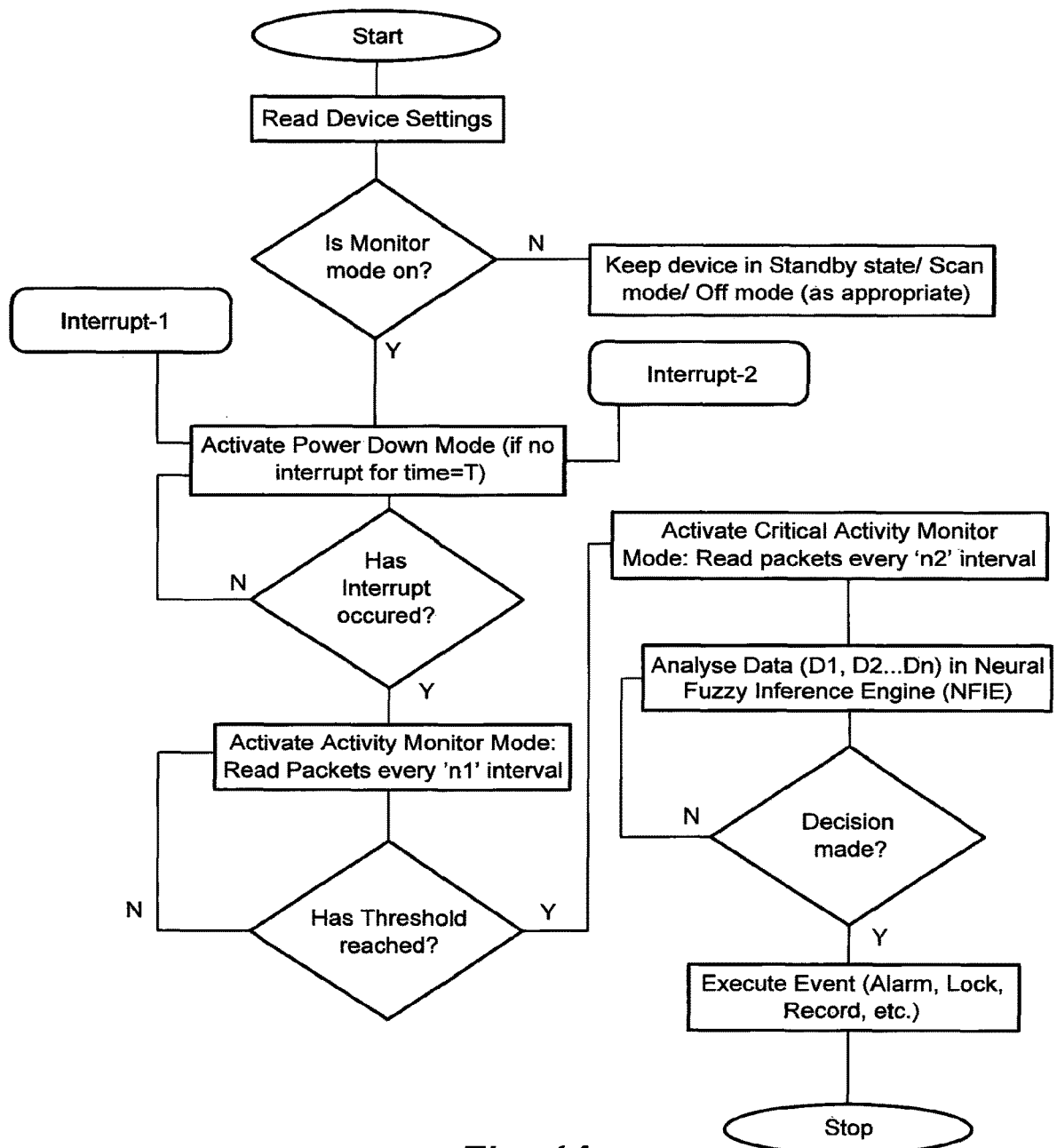
FIG. 4A illustrates an operational algorithm for a monitor forming part of a monitoring system.
Figure 4B:
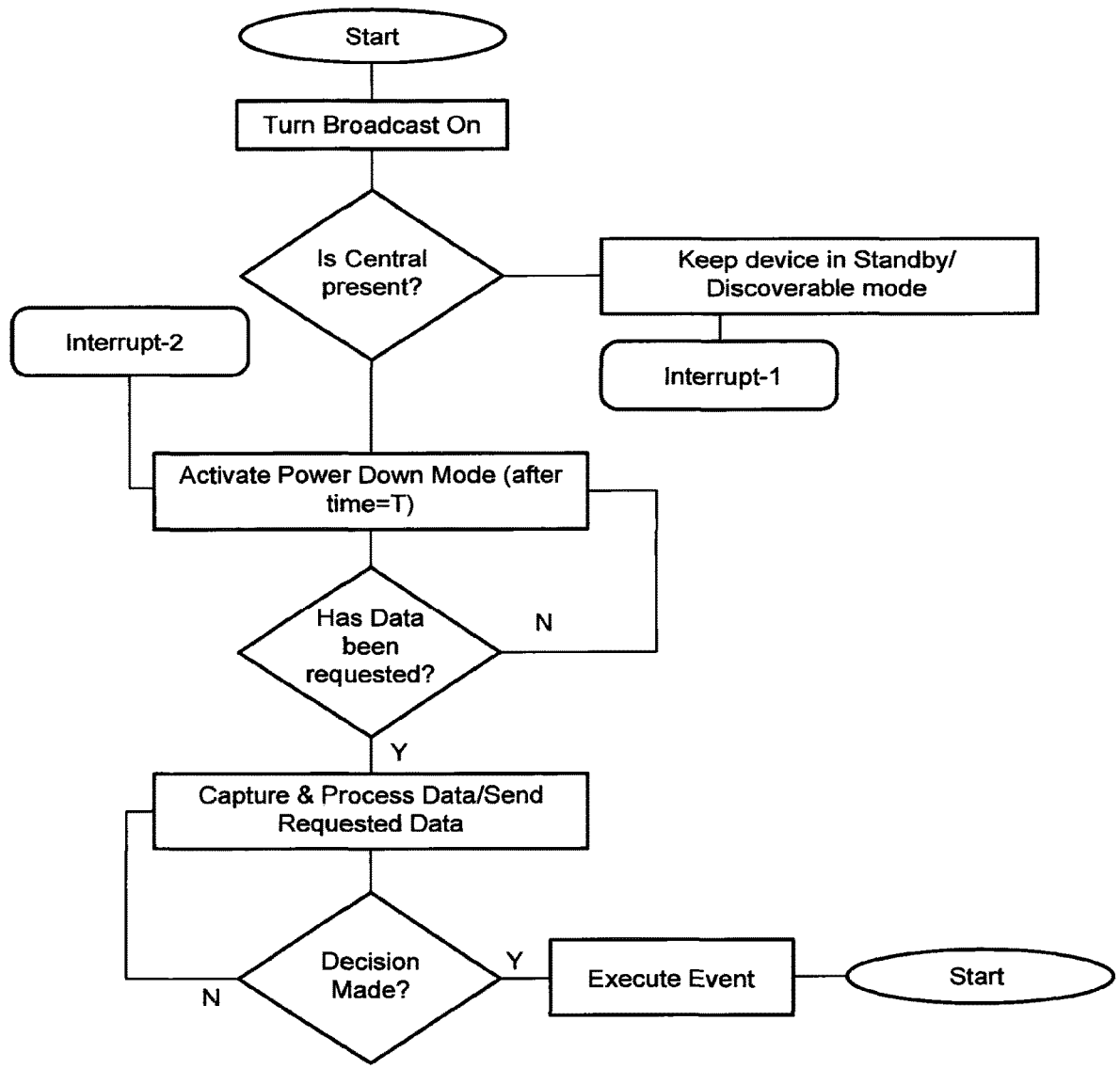
FIG. 4B illustrates an operational algorithm for a tag forming part of a monitoring system.

FIG. 4A illustrates an example of an operational algorithm for a monitor, and FIG. 4B illustrates an example of operational algorithm for a tag/peripheral.

Referring to FIG. 4A, the monitor's settings are first read, and it is put into a power-down mode (it may also be referred to as "PD mode" which may take advantage of the minimum connection parameters or as needed be in a "Scan mode (active/passive)/Off mode where appropriate"). Upon occurrence of an interrupt event, the monitor moves from its power-down mode to an activity monitor mode.

Similarly, as shown in FIG. 4B, the tag is set initially to be in an advertising mode, which for BLE implementations can for example be a directed discoverable mode. It will attempt to connect to a central device, otherwise it will enter a further power-down mode (lower latency). Upon occurrence of an interrupt event, the tag moves from its power-down mode to an active mode.

An interrupt may be triggered from the monitor ("Interrupt-1" in FIGS. 4A and 4B). This interrupt can be triggered by hardware, for example from an accelerometer output, or by software, for example when a monitor moves outside of a safe zone or if a user interacting with the monitor through a user interface, such as a software enabled button to utilize an optional 'Find' feature which helps to ring and find objects via sound/flash it's LED.

Interrupt-2 occurs from the peripheral side device. This can be hardware (ACC) driven or it could be a periodic wake up (software programmed). Interrupt-2 is communicated to the central device only via the radio and vice versa for Interrupt-1 from central to peripheral side. With this technique a peripheral device is in a low power standby state or a discoverable state (as required) or even for a connected state the slave latency is appropriately adjusted in the case of a BLE connection.

Interrupt events (Interrupt-1 and Interrupt-2) may be exchanged via radio link between the monitor and the tag; so that an interrupt event from either one of the monitor or the tag can cause a corresponding interrupt event on the other of the monitor or the tag.

While the monitor is in its activity monitor mode and the tag is in its connected state, a connection interval occurs every "n1" seconds (or alternatively every n1 milliseconds). In a BLE connection between two devices, the devices each send and receive packets from one another on a specific channel, then "meet" at a new channel at a specific amount of time later. The link layer of the BLE stack handles the channel switching. This "meeting" where the two devices send and receive packets is known as a "connection event". The packet exchange may involve the exchange of empty packets or data packets with varying payload. Even if there is no application data to be sent or received, the two devices will still exchange link layer data to maintain the connection. The connection interval, m, is the time between these connection events.

Setting the connection interval at a fixed value can create inefficiency. If a connection interval is too short, more packets are exchanged than is needed and there is a significant power drain on the monitor and the tag. If the monitor is a mobile telephone it will be rechargeable but nonetheless a significant Bluetooth power drain can have an appreciable effect on battery life. If the tag is a standalone device then a significant Bluetooth power drain will shorten the battery life to a few days or weeks and will be an inconvenience for a user. However, if the connection interval is too high, then the reliability of the detection algorithm is compromised. First of all, the separation of monitor from tag might not be detected for a long time, and secondly it can be incorrectly interpreted due to environmental noise. A relatively long detection time means that the tag (and the item to which it is attached) is already far from the user before an alarm is triggered, which reduces the chances of finding the tag again, eg. a handbag left in a train or a cab would have been driven away already. Also, the long time between connection events means that less data is collected per unit time, so the chances of a false positive alarm are increased.

Figure 5:
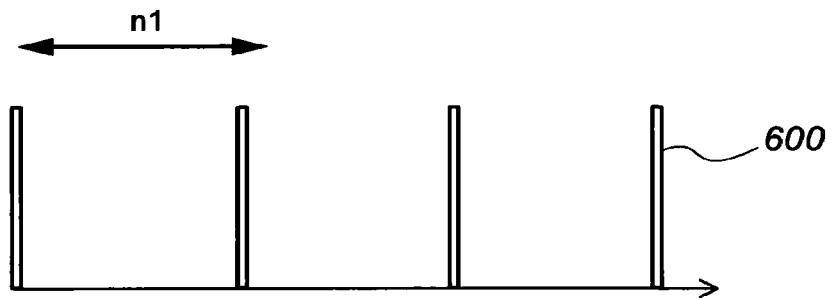
FIGS. 5 and 6 illustrate connection intervals for a radio communication system.
Figure 6:
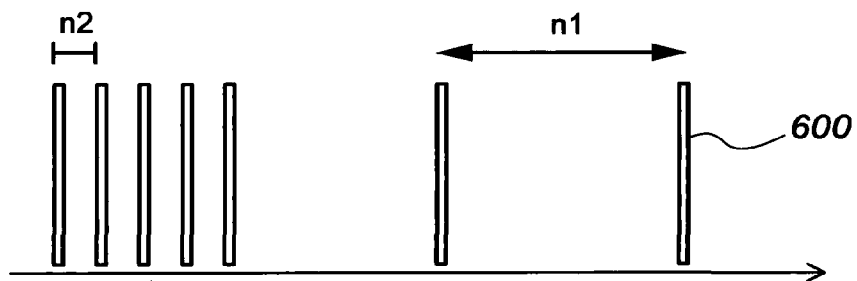

This balance between battery life and responsiveness can be addressed by dynamically adjusting the connection interval between monitor and tag, which is illustrated in FIGS. 5 and 6. FIG. 5 shows an activity monitor mode, where connection events 600 are spaced in time (represented by the horizontal arrow) by a set connection interval, n1. The monitor can be switch to a critical activity monitor mode, in which a shorter connection interval is employed. FIG. 6 shows an example of a transition between a critical activity monitor mode characterised by a relatively short connection interval of n2, and the activity monitor mode characterised by a relatively long connection interval of n1.

The critical activity monitor mode provides maximum responsiveness, as a greater amount of data per unit time can be collected. The critical activity monitor mode requires higher battery power because of the relatively shorter connection interval. However the duration of the periods when this higher battery power is required can be reduced by dynamically switching to the critical activity monitor mode rather than employing it throughout the course of the connection of a monitor to a tag.

The Connection Interval (X) is dynamically chosen and adjusted within the context of the above algorithm in order to save battery and yet be responsive enough to avoid a false alert. The challenge with implementing a dynamic interval change is that when a L2CAP connection parameter update request is made in BLE a few messages including response and acknowledgement need be made over the link at slower interval. For optimal implementation the algorithm may suitably handle this by using a relatively shorter connection interval combined with the appropriate slave latency parameter which can all be dynamically adjusted. The Power Down (PD mode) adjusts Connection Parameters (CPs) to minimum acceptable levels as required. Both 'n1' and 'n2' may suitably be chosen from a 'millisecond' interval.

A decision to move from the activity monitor mode to the critical activity monitor mode is made based on the measurement of one or more parameters, and comparing the parameters, or statistical measures derived from the parameters, to a given mode transition threshold.

If the measurements move from a value below the mode transition threshold to a value above it, then a transition from the activity monitoring mode to the critical activity monitoring mode is triggered, and if the measurements move from a value above the mode transition threshold to a value below it, then a transition from the critical activity monitoring mode to the activity monitoring mode is triggered. It will be appreciated that, depending on the parameters used, the relationship between the measured parameters and the mode transition threshold might be inverted, that is, a value below the threshold (rather than above it) might correspond to the critical activity monitoring mode and a value above the mode transition threshold (rather than below it) might correspond to the activity monitoring mode.

In a preferred embodiment, the decision to move from the activity monitor mode to the critical activity monitor mode is made based on signal strength measurement. The decision can be made on the basis of a comparison with a given mode transition threshold, or alternatively may be based on a derived statistical measure such as a moving average measurement. Data packets received by the monitor are analysed to read the signal strength and may be stored as a moving average of size in a storage means provided at the monitor. The RSSI(i) of each new packet is then compared to the RSSI base of sample values and if the RSSI(i) is at or above the mode transition threshold value, preferably offset from the base value for a number of confirmations, then the system switches to the Critical mode and requests data packets.

In this way, the higher data rates are only employed when needed. The mode transition threshold provides a way of maintaining a connection to monitor proximity in a (relatively) low power mode, but which quickly moves to a more accurate proximity monitoring mode when the separation of monitor and tag starts to increase.

The mode transition decision is made through the operation of a process (algorithm) whose behaviour relies only on the values of the monitored parameters. That is, the decision is not triggered by and does not need to rely upon the use of an active external interrupt.

Decision logic may be provided at the monitor which stores a mode transition threshold value, receives the parameters as inputs, monitors the parameter values (including storing historical values), compares the parameters with the stored threshold and performs a decision which is then output as a mode transition decision signal.

Once the critical activity monitor mode is activated, the detection of a separation event will be more reliable. However in preferred embodiments of the disclosure, the decision to trigger an alarm (or other event as discussed below) can be further enhanced. This enhancement is illustrated in FIG. 4A by the optional steps of "Analys[ing] Data (D1, D2 . . . Dn) in Neural Fuzzy Inference Engine (NFIE)"; and the processing of a "yes" or "no" decision from this component in FIGS. 4A and 4B.

With this enhancement, a decision to trigger an event is made based on the measurement of one or more parameters. The parameters can include radio parameters and/or non-radio parameters. Where two or more parameters are used, the decision can be made based on a combination of the parameters. Each of the parameters may have a weighting associated with it, defining its contribution to an overall score derived from the parameters. The measured parameters, or a score derived from the measured parameters, may be compared to an event trigger threshold value.

Decision logic may be provided at the monitor which stores an event trigger threshold value, receives the parameters as inputs, monitors the parameter values (including storing historical values), compares the parameters with the stored threshold and performs a decision which is output as a decision signal. For embodiments where the monitor comprises a portable computing device the decision logic may be provided in the form of (or as a component part of) an application which interacts with the relevant components of the mobile computing device to perform its functions. In alternative embodiments where the monitor is provided as a stand-alone device, the decision logic may be implemented in hardware as an ASIC of FPGA, or in firmware, software or any suitable combination of these techniques.

In embodiments which comprise both the capability to dynamically alter the connection interval and which employ enhancements for making an event trigger decision, common decision logic circuitry or application software may be provided to perform the mode transition decision and the event trigger decision.

The event trigger decision is made through the operation of a process (algorithm) whose behaviour relies only on the values of the monitored parameters.

In FIGS. 4A and 4B, the parameters are derived from various data sources labelled as D1, D2 . . . DN) where N is the number of data sources that are used. Generally, one parameter will be associated with each data source although it is possible to define additional or alternative parameters based on the combination of the outputs from one or more data sources, or from different statistical measurements derived from a single data source.

The parameters may comprise radio parameters including signal strength parameters such as RSSI, link quality index (LQI), bit error rate (BER or BR); timing parameters such as a time of flight measurement; and other parameters such as data from positioning systems such as GPS, positional and other data from Wi-Fi antennae, localisation data from base station triangulation and other sources. The parameters may also comprise non-radio and other hardware-derived parameters such as data from accelerometers (herein, ACC data), gyroscopes, a compass, light sensors and other devices.

The decision logic operates so that the event trigger decision takes account of environmental factors. In a preferred embodiment the decision logic comprises a fuzzy logic component, which receives one or more of the parameters, and assigns a weight to each of them as mentioned above. The decision logic component may also in addition or as an alternative comprise a neural network component to further improve the weights that are applied to each parameter, accurately estimate distances and for reduction of false positives and false negatives.

The fuzzy (or neural fuzzy) system is designed to predict and understand the environment under which the system is working and adjust the event trigger threshold according to this environment and to accurately measure the distance between a monitor and one or more tags and perceive the need to reliably execute an event.

The possibility of false alarms may be unacceptably high if only RSSI is used. Preferred forms of the system include features to reduce the possibility of false alarms, both false positive and false negative. The sources which contribute to false alarms in this radio system are: multi-path interference, attenuation through the human body and other materials, orientation of the transmitter and receiver units, and environment: noise cancellation and adjustments are required.

Environmental parameters such as wind, vibrations, gravitational attraction, variations of temperature, variations of humidity, and also electromagnetic factors and radio sources such as interference from Wi-Fi hotspots, transmission devices and so on will also have an impact on the radio signal and hence the signal strength measured. It is not possible in this case to measure or control all of these external parameters. However, an artificially trained neural network with the use of fuzzy logic analysis on the data sets is able to reasonably predict separation distance and hence allow more reliable operation of system in noisy environment.

In order to understand the effect of environmental parameters on the system training data sets are used and the impact on the signal strength for various different scenarios is noted. Training examples will distinguish variations when one object moves, the other does not, when both moves, when one or both is in a pocket, bag or backpack; and other patterns in which the signal strength drops such as when a source of attenuation such as the human body suddenly appears in between the objects and blocks some signals.

It is also possible to employ a digital filter to remove data sets that lie outside of predetermined boundaries and also to smooth out the data sets. Data 1 . . . N from N different sources (and/or from N different parameters) may be combined before being output.

We consider an example embodiment, where the measured parameters comprise RSSI data, accelerometer data, and further timing data or LQI data.

In this example, D1=RSSI and D2=ACC data; D3=ToF data; D4=LQI data

Data set (D1): To measure the distance based on RSSI parameter the following may be applied: $D_{txr}=10[(PTX-k-RSSI+G)/10 n]$ where PTX is the transmitted power; G is the total antenna gain: $G=GTX+GRX$ where GTX and GRX are transmitter and receiver antenna gains; k is the factor derived from speed at wave and the frequency where k=20 log (c/(4*pi*f)); C is the speed of light (3×10$^8$ m/s); f is the central frequency (2.44 GHz); n is the attenuation factor; and Dtxr is the distance between transmitter and receiver (in m).

Figure 7:
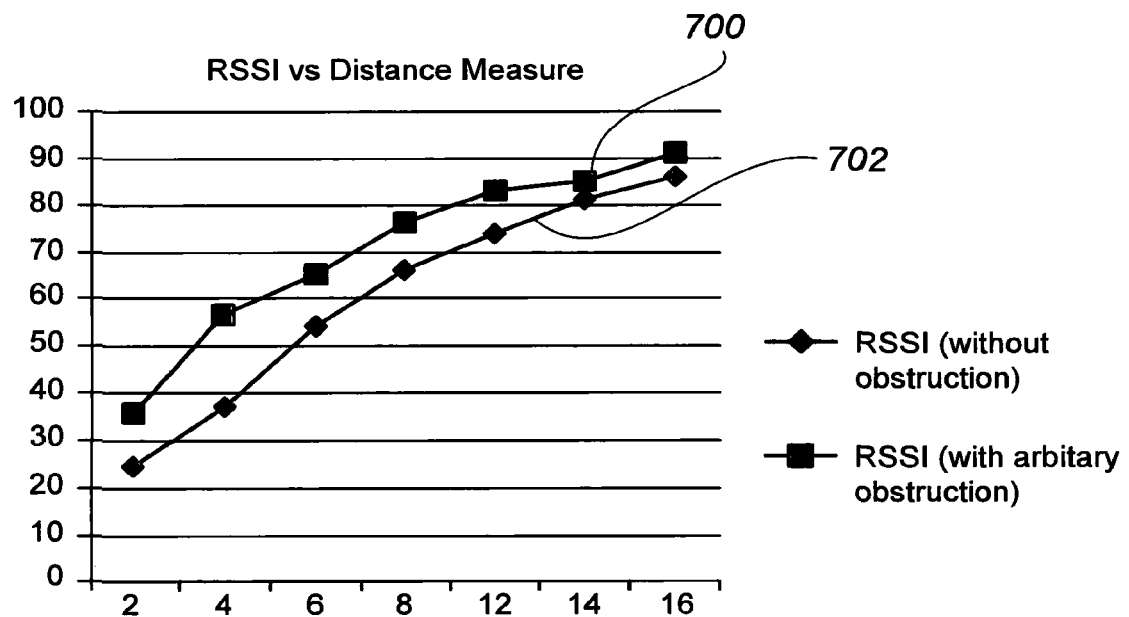
FIG. 7 illustrates RSSI data.

However, this can only be an estimated approximation of the distance as the measured value of signal strength is affected by the external parameters as discussed above. This is shown in FIG. 7 which shows an RSSI (y-axis) versus distance (x-axis) for a first scenario 700 with an arbitrary obstruction and for a second scenario 702 without obstruction.

Further artificial training example sets may be used in order for the neural network to understand the user environment in operation. For example, RSSI data for indoor scenarios such as monitor and tag having aligned antennae, a screen/board interposed between monitor and tag (to represent an arbitrary obstruction), and the tag being inside a backpack, and for outdoor/indoor scenarios can be gathered and the differences in RSSI curves are analysed.

A summation function can be used which takes into account the Gaussian Moving Average of the data sample D1 and it returns the summation of the value of D1 offset with respect to former value(s) for the time interval T=t where t is chosen by the artificially trained neural system. A regression analysis technique can be used as part of this.

Figure 8:
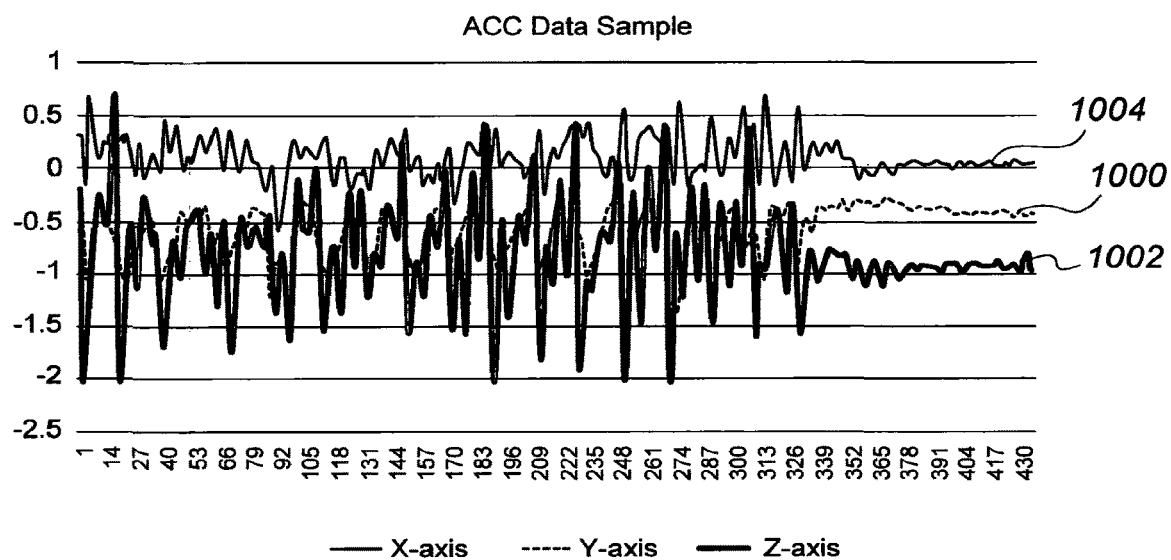
FIG. 8 illustrates accelerometer data.

Data set (D2): In conjunction, based on the acceleration and movement data set (D2) the inertial distance travelled can be measured. The inertial distance measure takes into account the data from a three-axis accelerometer. Generally one axis of motion will have a greater standard deviation that the other axes. That axis is evaluated and the peak values measured. An exaggerated example of this is shown in FIG. 8, which shows acceleration over time for an x-axis 1000, y-axis 1002 and z-axis 1004 for the scenario of a tag in a backpack while a user is moving fast and then resting. The z-axis is the most active because of the vertical axis component of the motion.

A step summing algorithm can then be employed which takes into account the estimated inertial parameter count of the data sample D2 and returns a value of an estimated inertial distance measure for the time interval T=t where t is chosen by the artificially trained neural system.

When acceleration for a specific time interval is known, the distance can be calculated. However, the challenge is to know at what reference points to start the measurement and what reference frames can be used. The artificially trained neural network may provide the reference frames for different scenarios and one of this frame is chosen based on the real time data obtained by the system.

Data set (D3): Where another data set, i.e. the Time of Flight (ToF), D3 is available then the distance can be interpreted as: Distance=Speed×Time. While the speed of the radio wave is constant (c=3×10$^8$ m/s) the time it would take for the radio wave to travel the short distances in consideration is very small and extremely difficult to calculate. Use of expensive and sophisticated hardware help improve errors due to the clock offset, multipath etc. and help understand environments with obstacle attenuation. The Time of Flight (ToF) can be either single or round trip time and it could be based on an available parameter such as time of arrival (ToA), the time-difference of arrival (TDoA), or the angle of arrival (AoA) where antenna's phase response is known and where it can be suitably applied. The ToF mechanism can be applied for relatively higher distances only. Where such data can be availed it may be included as a data set for the neural fuzzy system to act upon.

Data set (D4): Where yet another data set, i.e. any further indication of the Link Quality (LQ), D4 is available then a more holistic approach to understand the environment and the associated noise, or the level of an outside obstacle can be assessed. The Link Quality Estimation can be either hardware based where available or software based. In a typical system this information is held at the Controller part of the Link Layer (LL) of the protocol stack. For hardware based estimators the Link Quality Indicator (LQI) is the simplest LQ parameter. However in many commercial system/standardized radio hardware this information is not readily available. Other parameters which indicate the quality of a given link such as Packet delivery of the link; link Stability Factor (SF); link Asymmetry between the uplink and the downlink; channel quality measured through the Signal-to-Noise ratio (SNR) or the Bit Error Rate (BER), Cyclic Redundancy Check (CRC) or another derived estimation may also suitably be used either in combination to the standard LQI, or combined through a fuzzy based analysis.

The decision logic (NFIE) then takes into account all data sets available/required to estimate appropriately and applies the weights to arrive at an estimated distance measure which is then matched to the selected user preference thresholds and decision to trigger an autonomous event is made.

The weights applied to D1, D2, D3, D4 may be determined by the neural fuzzy component on the confidence level under which the data measurement can be considered reliable, in addition to the pre training that uses experimental observation on the data samples and certain confidence thresholds are pre known to the system.

In general the combination of a radio based parameter with a non-radio parameter provides additional intelligence, so the ACC data may be usefully combined with one or more of the other, radio, data from the parameters mentioned above.

It is to be appreciated that the enhanced (neural fuzzy) decision making process that governs when an event is triggered can be implemented in embodiments where there is no dynamic configuration of the connection interval; and vice versa. Alternatively both elements can be provided and can function together.

It is also to be appreciated that, where multiple parameters are used to dynamically determine the threshold for the event trigger, those same parameters may also advantageously be used as inputs for the decision to transition from the activity monitor mode to the critical activity monitor mode. Both the mode transition threshold and the event trigger threshold may be dynamically adjusted according to multiple parameters, and may optionally be under the control of decision logic employing a fuzzy logic component.

An embodiment described above mentions that the decision to move from the activity monitor mode to the critical activity monitor mode may be made based on an RSSI measurement. However it is also possible to make this decision based on other parameters in the same manner and using the same methods as described above with respect to the decision to trigger an event once in critical activity monitor mode. That is, the mode transition threshold may also be dynamically adjusted according to multiple parameters (environmental conditions) as well as the event trigger threshold.

The trigger decision algorithm is preferably effected by an adaptive Neural-fuzzy Inference Engine (NFIE) which takes into consideration environmental parameters such as noise and adaptive RSSI measure, effectively weighting and filtering false data. The NFIE can intelligently and autonomously adjust the trigger threshold by a certain percentage based on past and predicted environmental effects in order to avoid both false positive and false negative alarms.

In this embodiment of the disclosure, the neural fuzzy system bases the decision utilising more than one parameter in the fuzzy associative matrices with fuzzy random variables of the said parameter.

False alarms caused by changes in orientation are generally caused by sudden changes in orientation. The optional 3-axis accelerometer 132 in the tag 12 may be used to deal with this, preferably in conjunction with a 3-axis accelerometer in the monitor 10; modern smartphones capable of running BLE typically include this feature. RSSI values are filtered out when acceleration data indicates a change in orientation over a given threshold. Suitable thresholds can be determined empirically.

Another preferred feature of the disclosure is to adjust the alarm threshold according to the user environment. For example, when the user is travelling by train or cab there is an increased likelihood of accidentally leaving a tagged possession. The system is arranged such that the alarm threshold is adjusted to a lower level when the accelerometer readings make changes within specified references.

Existing techniques to estimate distances or trigger an event (for example an alarm) are based either on a single parameter such as a signal strength measure leading to inaccurate estimation. The disclosure proposes the use of multiple data sets that estimates separation distance between two mobile radio units on the basis of two or more data set parameters namely: Signal strength parameter RSSI, ACC data, Time of Flight, other signal strength parameters such as LQI and so on (other parameters may also be used).

In a preferred embodiment, a neural-fuzzy decision making system is implemented using a fuzzy system component that incorporates a learning algorithm derived from or based upon a neural network to determine its parameters by processing specified data samples.

For the neural part of the system, knowledge can be acquired by backpropagation, but the learning process may be relatively slow and analysis of the trained network can be rather difficult. Fuzzy systems in this case may be used as behaviour can be explained based on fuzzy rules and thus the performance of the system can be adjusted by tuning the rules. This is where a learning algorithm is usefully implemented and more adaptively adjusted from a system designer's perspective to analyse, optimise and control especially when the number of input variables is small.

To overcome the problem of precise acquisition, the neural network is suitably extended to extract fuzzy rules from available data or provide fuzzy random weights to mathematically model a pattern.

While fuzzy logic systems can reason with imprecisely represented information they cannot automatically acquire the rules needed to make those decisions. On the other hand neural networks while not so good at explaining how decisions are to be made are still efficient in pattern recognition, mapping and developing of a learning algorithm. A neural network with ability for pattern recognition in time series processing can be suitably employed for the monitoring system.

Figure 9:
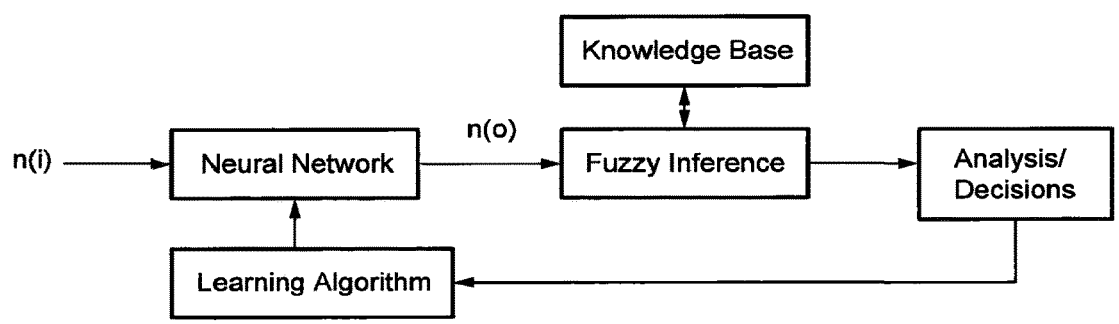
FIG. 9 illustrates component parts of a Neural-fuzzy inference engine.

To enable the system to also deal with uncertainties in a manner more like human decision making, fuzzy logic incorporated into the neural network in an integrated context and as an hybrid system called here a Neural Fuzzy Inference Engine (NFIE) provides a preferred solution. FIG. 9 illustrates an example implementation of an NFIE, wherein a neural network receives neural input parameters n(i) and outputs neural output parameters n(o). Alternatively, for each linguistic statement, the fuzzy interface block may provide an input vector to a multi-layer neural network which is adapted to make the decisions.

If only a single parameter such as a signal strength measure is used to estimate distances and/or trigger an event (for example an alarm), it may tend to lead to inaccurate distance estimation and/or a false alarm. The disclosure proposes the use of multiple data sets that estimates separation distance between two mobile radio units on the basis of two or more data set parameters namely: Signal strength parameter RSSI, accelerometer data, Time of Flight, and other radio signal parameters that indicate link quality, or LQI.

In order to better estimate the separation distance and judge the necessity to trigger a specified event, combining of all the available data sets may be used to get a holistic characterization by the NFIE system.

Signal strength alone is affected by several aspects that are usually imprecisely measured. Fuzzy logic provides a convenient technique to express and combine such imprecise knowledge while neural network can aid in the development of a learning algorithm. Individual data sets are stated in linguistic terms and combined in a fuzzy rule whose evaluation gives the degree of membership of the data in the fuzzy subset of available data.

For instance if only RSSI is available and it is found that the RSSI(i) is greater than a given threshold and say this threshold is set at 35% deviation from the base band value/moving average of most recent RSSI values then this would return a '1' or a 'yes' when such condition is reached, and a '0' or a 'no' otherwise. It is preferable that instead of a fixed such threshold the threshold itself can also be adapted and altered by the neural fuzzy system. This is because when the monitor or tag is in a user pocket or backpack it would have a different RSSI(i) value at say a distance of five meters from each other compared to when both devices are in free space.

Either for the specified data sample, given two different data of this same data set, or two components from an alternative data sets (RSSI & LQI) where one based on the value of RSSI(i) may provide a distance measure with certain x % confidence and the second based on say a LQI parameter measure give y % confidence. A fuzzy logic based system can be implemented to handle this type of 'relativity'. The decision to assign the fuzzy random weights is based on assessment of parameters that affect each data set under consideration and the degree of certainty to which this is known from the parameters available.

As an example the following rule base connects RSSI & LQI:

When sent signal is relatively weak: IF RSSI is low AND LQI is high THEN environment noise is high compared to the strength of the sent signal: IF RSSI is low AND LQI is low THEN environment noise is very low.

When the sent signal is relatively strong: IF RSSI is high AND LQI is low THEN environment noise is low compared to the strength of the sent signal: IF RSSI is high AND LQI is high THEN sent signal is high and the noise coming from an interferer is high and in phase; etc.

As an example RSSI(i) can be considered a variable and LQI(i) another such variable which is expressed in linguistic terms. The membership of the data in the Fuzzy set, is a matter of degree rather than a yes-no situation. It ranges in the interval [0 . . . 1].

Now we can combine multiple data sets to properly assess the distance measure, each such combination is performed by a Fuzzy IF-THEN Rule. A fuzzy rule combines the linguistic variables using connectors (operators) such as AND and OR. The evaluation of the rule using a fuzzy operator returns a membership degree for each set, for example assignation of '0' assigned to low probability and assignation of '1' for highest probability and 0.9, 0.8, . . . membership(s) in between to evaluate VERY HIGH, HIGH, MOD, or LOW, or VERY LOW degree of certainty.

Further each data set or the relative values of can be smoothed using a suitable digital filter to improve the reliability. The filter can be a simple moving average filter, weighed moving average, kalman filter; or other techniques can be used that are appropriate to the specified data set.

In contrast to systems which only assess one single property thus providing a single parameter of measure only, applying more data sets with the possibility of combining them through fuzzy Logic or a Neural Fuzzy decision making system or utilization of the specified data sets by any other stand alone means has been shown to provide more precise and real time decision making over existing solutions, in terms of both system responsiveness and accuracy of measurement.

Figure 10:
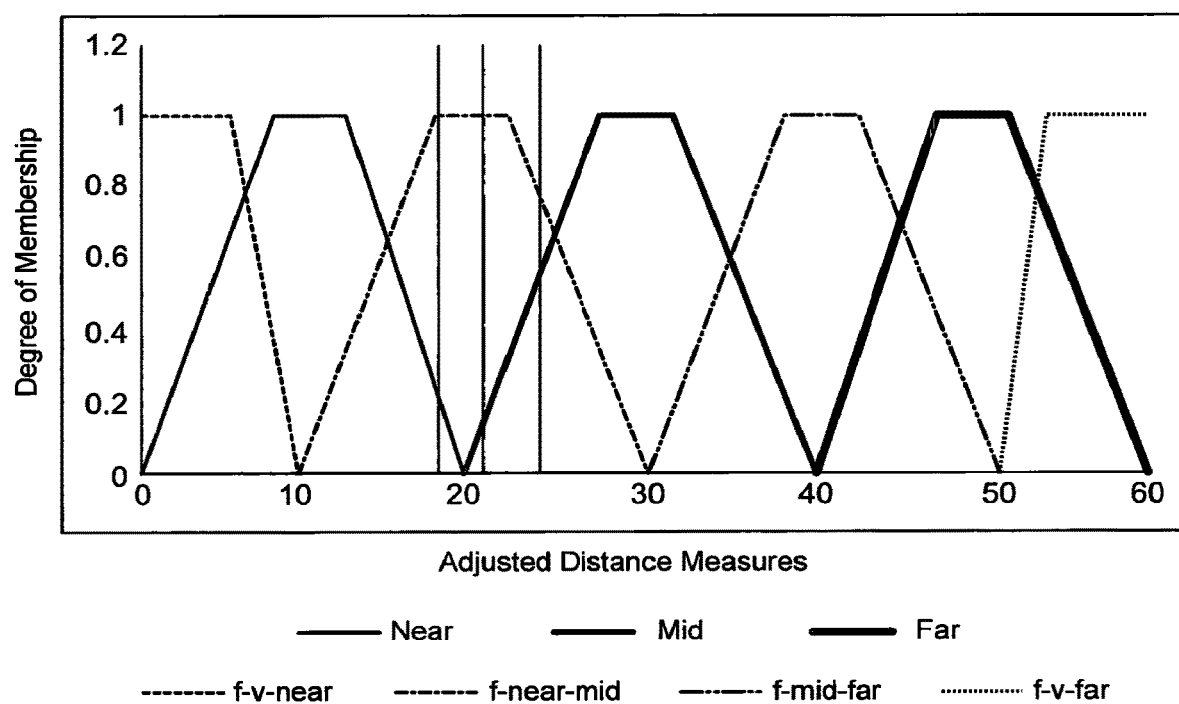
FIG. 10 illustrates examples of fuzzy membership classes used in the Neural-fuzzy inference engine of FIG. 9.
Figure 11:
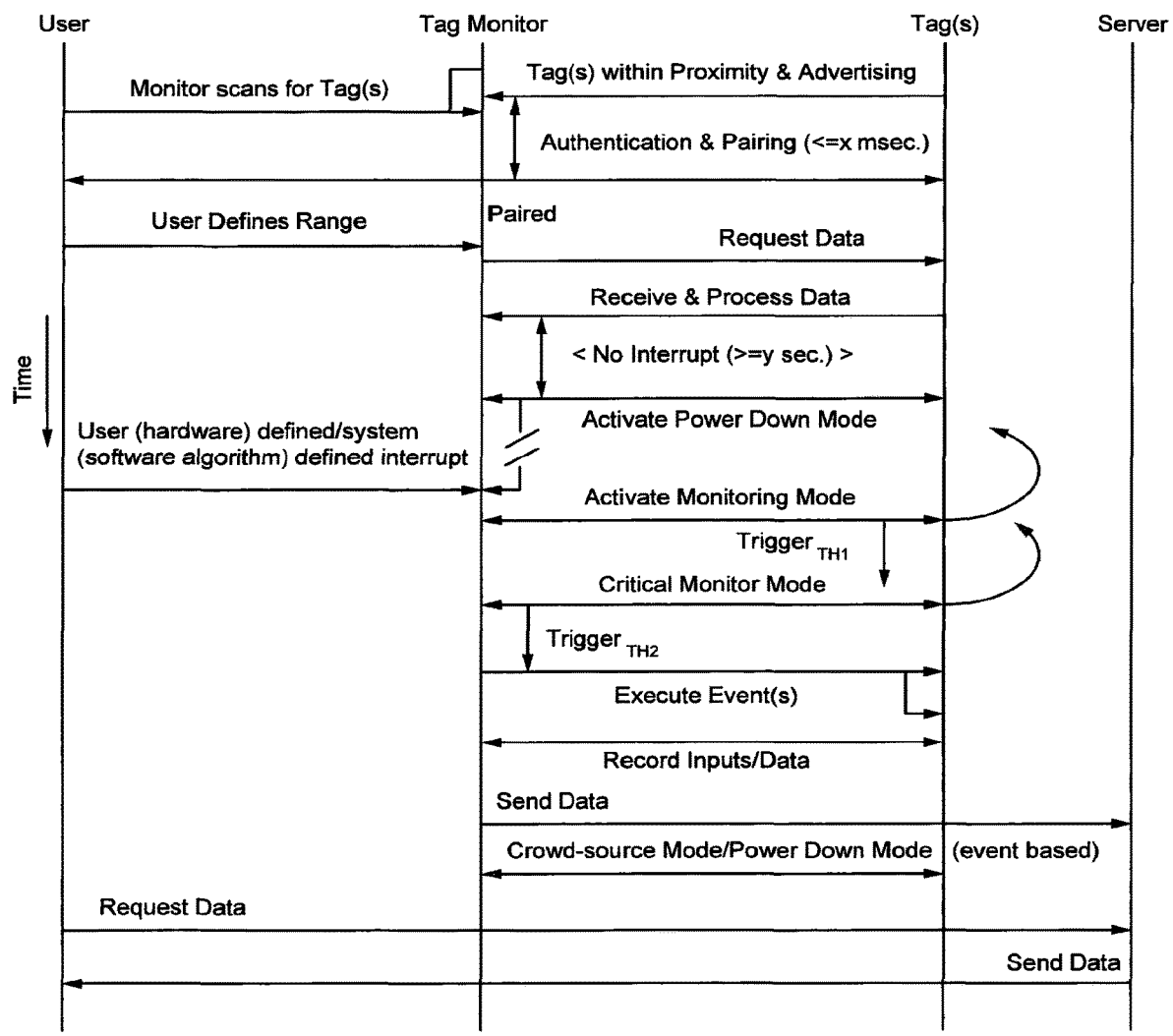
FIG. 11 is a sequence diagram relating to the use cases of FIG. 3.

The user, through a stipulated user interface (UI) may preferably want to trigger an event (such as generate an alert) at a certain specified distance: Near, Medium, Far each corresponding to a stipulated range between 0 to 60 m as preferably set by the user. An example of fuzzy membership classes for such an arrangement is shown in FIG. 10.

In one embodiment of the fuzzy logic implementation the linguistic terms "near", "mid" and "far" are represented as the memberships for each range. This is suitably a third of the total range. In the above example the highest range is 60 m. In this case the range threshold between "near" and "mid" is approximately at 20 meters separation between monitor and tag. This can however be any other set, pre-assigned or dynamically assigned value. The intersections are then further defined in linguistic terms as fuzzy-very-near (f-v-near) for the one that falls within closest fuzzy range, which would have the highest degree of membership for the estimated range of approximately 7.5 meters. The one between "near" and "mid" is assigned f-near-mid which is closely related to the 20 meters separation range and so on; the one between "mid" and "far" is assigned f-mid-far and the next intersect as f-very-far. These membership functions then forms the seven fuzzy membership classes for this stipulated interface. Note a particular measurement value in this case would belong to any two associated classes with a varying degree of membership.

This can then be modelled mathematically. The distance estimate made from each available data set can be mapped to membership classes and the node individually counts the number of points that are within each of the above classes with its associated degree of membership. In above example a random measure with data set of 03 points for an actual distance measure of 20 meters is noted.

The "near" class for this case returns an associated membership of: 0.25+0+0=0.25; The "fuzzy-near-mid" class for this case returns an associated membership of: 1+1+ 0.85=2.85; The "near" class for this case returns an associated membership of 0+0.1+0.5=0.60.

Here it is observed that the system has information to predict to a 'HIGH' degree that the distance between the monitor and the tag is about 20 meters. This is a simplistic example. The Neural Fuzzy system is suitably trained to make more complex decisions. Finally a precisely detected fuzzy output decision is made or a fixed value returned as required.

Either the distance estimate is computed mathematically for a particular data set or a suitable measure such as RSSI is noted as 'how close' it is to the corresponding pre-set threshold parameter for a set distance measure corresponding to the membership classes. Without utilization of the fuzzy logic based system and/or more data sets, as soon as some incorrect data arrives as for example radio interference say due to presence of noise attenuating the signal, it would trigger a misinterpreted distance measure and a possible false positive alert.

When the system is in a relatively stable environment (eg. not moving and low radio interference) more points will gather around the same membership class. With the fuzzy logic membership the number of elements belonging to a specific class can be arrived at and also transitions from one range to another can be monitored for a moving unit. For instance, the distance obtained from data set=RSSI data can be suitably combined and compared with the inertial distance measure or data obtained from LQI data set. When this indicates a movement from higher points of association with the f-v-near membership class to the f-near-mid membership class after time 't' then this measurement denotes that the "Near" range threshold is likely being crossed. Further fuzzy rules are applied and boundary windows set to check if it is practically possible for a system to cover the particular inertial distance within time (t). The presence of an obstacle such as the human body can cause radio interference and result in an incorrect RSSI read while a second data set will conform to a lower fuzzy membership class and hence impact the overall measured estimate for the system. It can also be noted that such a system is most suited for measurements between 7.5 meters to the 50 meter range measurements as empirically observed for a 2.4 GHz system only in this case.

Further fuzzy membership classes may be added to more closely monitor the range transitions. Through a suitable logic chosen by the algorithm, fuzzy weights can be utilized based on the behaviour of the system in a particular instance based on the rule base applied to the fuzzy logic system. The rule base may also include a dynamic capacity to alter thresholds as per the perceived need.

As a further example: Rule R(i): IF user is found to be in a train/cab THEN adjust Threshold Th(i) at x % below set threshold parameter; where it should be noted the ACC data can provide information on users whereabouts. However, for an object moving at constant velocity the relative acceleration is zero. In such case other data set including location services can be used to obtain appropriate data.

In one embodiment of the system makes use of both the accelerometer values (a) for the time intervals (t) to read data (d) which is weighed with Neural Fuzzy weights (w).

The trigger threshold is then adaptively based upon d1×w1+d2×w2+ . . . dn×wn (weighed); where the weights (w) for each data sample are delegated from by the Neural Fuzzy system.

Many smartphones include a geo-location facility, such as GPS. Where this is present, the disclosure may provide a facility to reduce battery consumption.

This is based on the factor that it is not usually necessary to guard against loss when in a particular location, typically the home/office. Accordingly, the monitor may be programmed to put the system in sleep mode whenever the geo-location information indicates that the monitor is in a predefined location such as the home.

The monitor may also make use of power down and sleep modes in particular locations by relying on positional information other than GPS. For example, the system can detect such locations by detecting proximity to known WiFi hotspots or proximity to known BLE devices of fixed location.

This "safe zone" feature can be implemented independently of the dynamic connection interval, intelligent event triggering, neuro-fuzzy logic and crowd-sourcing features of the disclosure—that is, the disclosure contemplates the provision of a monitoring system comprising a monitor and at least one tag, each tag being adapted to be attached to or contained within an object to be monitored; the monitor including a radio transmitter/receiver and each tag including a radio transmitter/receiver adapted to transmit periodic signals; the monitor being operable to derive a measurement of the separation distance between the monitor and a given tag and to trigger an event if that distance exceeds a set separation limit, in which the alarm system is in a power-down/sleep mode whenever the geo-location means detects that it is at a predetermined "home" location.

A further optional feature for GPS-enabled monitor devices is to record the geographical coordinates of the location whenever an event such as an alarm is initiated. Thus, even if the user is unaware of the alarm, or is unable to attend to it immediately, it will be possible for him to return to the location of the loss.

Figure 12:
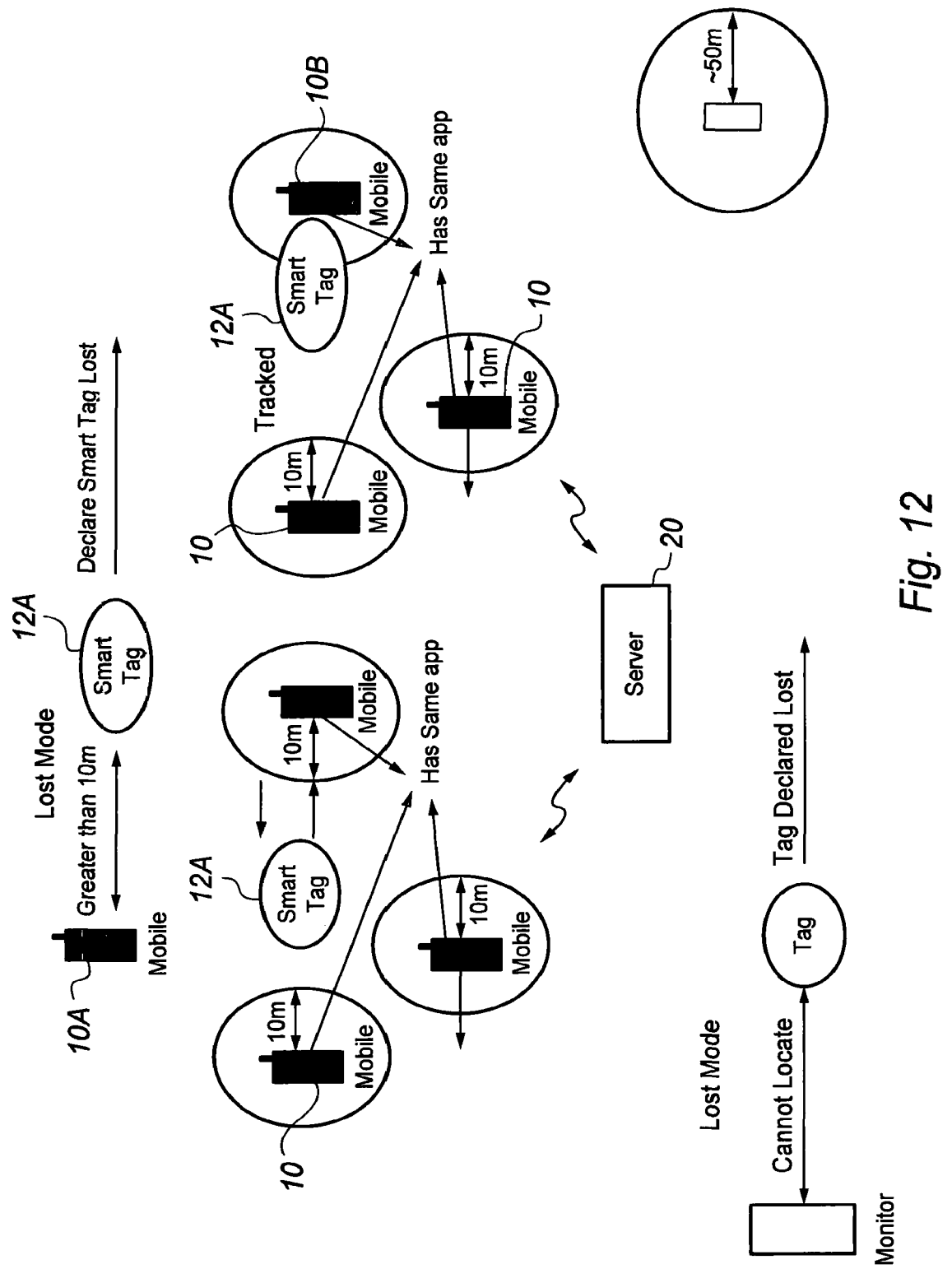
FIG. 12 is a schematic representation of an embodiment of the disclosure using crowd-sourcing.

It is also possible to make use of geo-location information together with a crowd-sourcing functionality. Referring to FIG. 12, a number of monitors 10 in the form of smartphones are provided with a crowd-sourcing application. A first monitor 10A has an associated tag 12A and an alarm range of 10 m. If the tag goes beyond this range and the user 12 cannot locate it, the tag 12A can be declared lost, its details being transmitted to other monitors 10 via a remote server 20. Thereafter, if that tag 12A comes within range of any monitor 10 and its identity recognised, the relevant monitor 10B transmits details of the tag and the current position of the detecting monitor 12B.

This "crowd-sourcing" feature can be implemented independently of the dynamic connection interval, intelligent event triggering, neuro-fuzzy logic and safe zone features of the disclosure—that is, the disclosure contemplates the provision of a monitoring system comprising a monitor and at least one tag, each tag being adapted to be attached to or contained within an object to be monitored; the monitor including a radio transmitter/receiver and each tag including a radio transmitter/receiver adapted to transmit periodic signals; the monitor being operable to derive a measurement of the separation distance between the monitor and a given tag and to trigger an event if that distance exceeds a set separation limit, in which the monitor, on generation of an event, sends said geo-location to a database held on a remote server; and optionally in which the monitor is arranged to communicate details of a lost object via the remote server to other similar monitors in a crowd-sourcing environment and to receive details if the object is located by another monitor.

A further modified embodiment of the disclosure makes use of a proprietary radio where the usage of a proprietary radio protocol is in conjunction with the BLE standard and where such a protocol utilises the same 2.4 GHz ISM band as Bluetooth or where such a protocol exists in a lower frequency band including sub-1 GHz band—and where the system utilising a lower frequency band consists of a dual-mode antenna.

The advantage of not using the crowded 2.4 GHz where possible for tag-to-tag communication is of high value especially in multiple tag systems. However, dual band presence of 2.4 GHz within system design ensures the device is able to communicate with a standard smartphone using the Bluetooth (specifically BLE) protocol.

The low power tags may also optionally employ a suitable energy harvesting technology.

The disclosure may also be applied to other uses. For example, it is desirable to screen lock mobile devices or prevent the unauthorised use of devices such as laptops and PCs. It is common for a user, for example in an office, to leave the vicinity of the computer while it is running. In one form of the disclosure, the user is provided with a tag (which could for example be embedded in an ID badge) and the computer operates as the monitor. If the user moves beyond the predetermined threshold distance the system event trigger does not produce an audible alarm, but rather operates to lock the computer, that is to render the keyboard and controls inoperative and optionally also close down the display, until the user returns within range.

While the disclosure has been described with reference to a specific use and preferred embodiments thereof, it will be understood by those skilled in the art that the disclosure has several other potential uses where it could be applied without departing from the spirit and scope of the disclosure.

For example, while preferred embodiments may comprise a monitor in the form of a smartphone running a suitable application and a tag that is a stand-alone device, it is to be appreciated that the disclosure could also apply to the monitoring of separation distances between two smartphones/tablets. Each smartphone could arbitrarily take on the role of a monitor or a tag, and the roles could be reversed when required.

It will also be appreciated that as the monitor/peripheral device may suitably be adopted as a keyfob and as it is BLE-enabled it can act as a mobile remote controller to a BLE smartphone, tablet or PC. For instance enabled with an interface such as hardware buttons can be used to control or monitor other entities for utility or entertainment use cases and where proximity monitoring mode may suitably run in the background.

It is understood that the detection algorithm as such can be applied in scenarios where distance between two radio units needs to be estimated reliably.

One such application of the system is as a location tracking device. Asset tags attached to objects can be utilized to track and find the objects in a Real Time Location Tracking (RTLS) context for indoor location mapping and distance estimation. This can be used in indoor location tracking in which a monitor/reader indicates if the user is getting 'closer'/'further' from the object being tracked. When the user is near enough to the particular asset tag, the buzzer can be sounded using the 'Find' feature or LEDs used for visual indication in order to assist with the tracking. It is found that in the RTLS context the whole or a subcomponent of the Neural Fuzzy system can be appropriately adopted to better estimate distances and for indoor localization of asset tags.

Also, while preferred embodiments make use of BLE it is to be appreciated that the disclosure could be applied for any chosen radio communication protocol, past or future. For example, the disclosure could also operate with classic Bluetooth. The disclosure relates to a proximity monitoring system in general. The BLE protocol may not be optimal for all schemes. The broader techniques are applicable and may be implemented where a proprietary protocol is utilized, or improvements can be made to existing BLE communication.

The invention claimed is:

1. A monitoring system, comprising:
   a plurality of user devices comprising:
   at least one monitor having decision logic; and
   at least one tag adapted for attachment to, or containment within, an object to be monitored, and also adapted to transmit periodic signals to the at least one monitor such that the at least one monitor is to derive a proximity status between the at least one tag and the at least one monitor,
   wherein the at least one monitor and/or the at least one tag comprises a primary user interface, wherein at least one secondary device can be wirelessly paired with the at least one monitor or the at least one tag,
   wherein the at least one secondary device comprises a secondary user interface,
   wherein any of the plurality of user devices, any of a plurality of user interfaces, and/or a remote server, is adapted to:
   declare by a user the at least one tag to be lost or out of a proximity zone via the decision logic to thereby trigger an event when the derived proximity status is not within a predefined proximity zone/threshold,
   indicate the derived proximity status on the at least one secondary device and/or the secondary user interface, or communicate details regarding the at least one tag with other similar monitors upon said triggering of said event or upon said declaration by the user from the plurality of user devices and/or the plurality of user interfaces, and
   transmit an alert to one or more of: the primary user interface, the secondary user interface, or the remote server,
   wherein the alert communicates the details regarding the at least one tag to the other similar monitors upon said triggering of said event or upon said declaration by said user or another user from a third user device or interface,
   wherein, when within the proximity zone of the at least one tag which has been declared out of the proximity zone and/or lost, one of the other similar monitors are to receive the details regarding the at least one tag and thereby respond by sending its geo-location information to the at least one monitor which triggered said event or said declaration by the user,
   wherein the at least one monitor or the at least one tag, when connected to one another or when outside the proximity zone, is switchable between a first mode in which a first frequency of packet exchange/advertisement/transmission is set at a first value, and a second mode in which a second frequency of packet exchange is set at a second value,
   wherein the at least one monitor or the at least one tag, when moving outside the proximity zone, generates one or more of a visual, audible, and a vibrational alert on at least one of: the primary user interface or the secondary user interface.

2. The monitoring system of claim 1, wherein the at least one tag is connectable to a central device in the first mode, and wherein the second mode has a lower latency than the first mode.

3. The monitoring system of claim 1, wherein the at least one monitor or the at least one tag is switchable from the second mode to the first mode upon occurrence of an interrupt event, wherein the interrupt event is triggered when the at least one monitor moves outside of a predetermined safe zone.

4. The monitoring system of claim 3, wherein the at least one monitor further comprises a button that is configured to find the at least one tag if the at least one monitor is within a predetermined distance from the at least one tag.

5. The monitoring system of claim 1, wherein the at least one monitor or the at least one tag comprises a radio transmitter and/or receiver.

6. The monitoring system of claim 1, wherein the at least one tag sends a signal to the at least one monitor at a predetermined frequency, and wherein the at least one monitor assesses the signal to determine a distance of separation between the at least one monitor and the at least one tag.

7. The monitoring system of claim 1, wherein the at least one tag comprises an antenna, a Bluetooth Low Energy (BLE) radio circuit, an input/output circuit, a power supply comprising a battery, and a computer processing unit (CPU).

8. The monitoring system of claim 1, wherein the at least one tag further comprises a 3-axis accelerometer and a buzzer configured to sound an alarm if the user moves a predetermined distance away from the at least one monitor while in possession of the at least one tag.

9. The monitoring system of claim 1, wherein the at least one tag is attachable to a person.

* * * * *